(12) United States Patent
Iikawa et al.

(10) Patent No.: US 6,388,826 B2
(45) Date of Patent: May 14, 2002

(54) DEVICE FOR ADJUSTING THE ECCENTRICITY OF A LENS IN A FRAME

(75) Inventors: Makoto Iikawa; Takuji Hamasaki, both of Saitama (JP)

(73) Assignee: Asahi Kogaku Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/767,693

(22) Filed: Jan. 24, 2001

(30) Foreign Application Priority Data

Jan. 26, 2000 (JP) ........................................ 2000-016787

(51) Int. Cl.[7] ................................................. G02B 7/02
(52) U.S. Cl. ........................ 359/822; 359/694; 359/819; 33/645
(58) Field of Search ........................ 33/645, 533, 200; 359/819, 822, 69, 820

(56) References Cited

U.S. PATENT DOCUMENTS

| | | | | |
|---|---|---|---|---|
| 4,601,560 A | * | 7/1986 | Isohata et al. | 353/122 |
| 4,724,126 A | * | 2/1988 | Siga et al. | 350/252 |
| 4,989,950 A | * | 2/1991 | Nakauchi | 350/251 |
| 5,298,096 A | * | 3/1994 | Yoshino et al. | 156/64 |
| 5,555,480 A | | 9/1996 | Tanaka et al. | |
| 5,717,528 A | * | 2/1998 | Ihara et al. | 359/694 |
| 5,757,559 A | | 5/1998 | Nomura et al. | |
| 6,130,788 A | * | 10/2000 | Nomura et al. | 359/694 |
| 6,204,979 B1 | * | 3/2001 | Matsui | 359/819 |
| 6,237,242 B1 | * | 5/2001 | Woytassek et al. | 33/645 |
| 6,262,853 B1 | * | 7/2001 | Takanashi et al. | 359/703 |
| 2001/0007514 A1 | * | 7/2001 | Aikawa | 359/823 |
| 2001/0015861 A1 | * | 8/2001 | Sasaki | 359/826 |
| 2001/0019459 A1 | * | 9/2001 | Denpo | 359/808 |
| 2001/0030814 A1 | * | 10/2001 | Koyama et al. | 359/811 |

FOREIGN PATENT DOCUMENTS

| | | | | |
|---|---|---|---|---|
| JP | 61155814 | | 9/1986 | |
| JP | 08334664 A | * | 12/1996 | G02B/7/02 |
| JP | 2000352648 A | * | 12/2000 | G02B/7/02 |

* cited by examiner

*Primary Examiner*—Diego Gutierrez
*Assistant Examiner*—Gail Verbilsky
(74) *Attorney, Agent, or Firm*—Greenblum & Bernstein, P.L.C.

(57) ABSTRACT

A lens eccentricity adjusting device includes a circular opening formed on a lens frame, a lens being fitted into the circular opening; at least three flat countersunk head screws each screwed into the lens frame, the flat countersunk head screws including a male thread portion that is screwed into the lens frame and a head portion having a tapered surface; and at least one elastic member positioned between the flat countersunk head screws and the rim of the lens. The eccentricity is adjusted by deforming at least one elastic member via pressure of the tapered surface of a corresponding flat countersunk head screw on the rim of the lens, in accordance with an amount the corresponding flat countersunk head screw is screwed into the lens frame, so that the lens is moved in the circular opening in a radial direction.

16 Claims, 3 Drawing Sheets

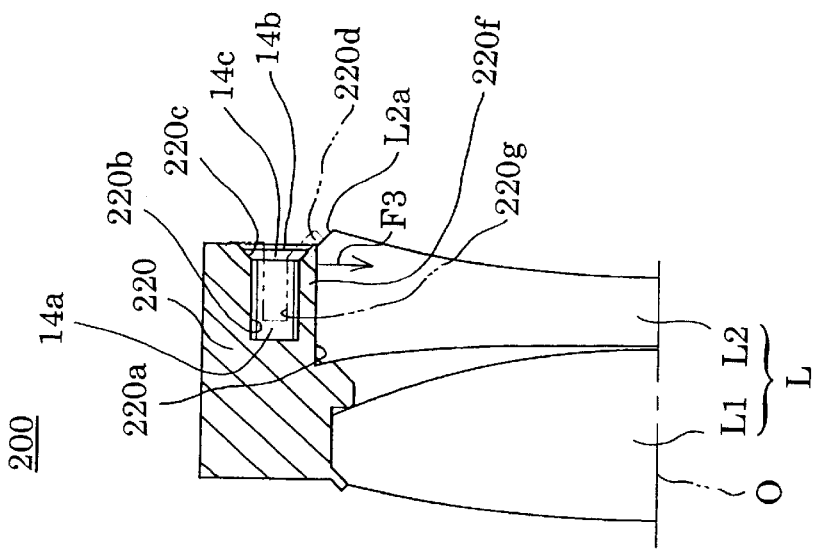
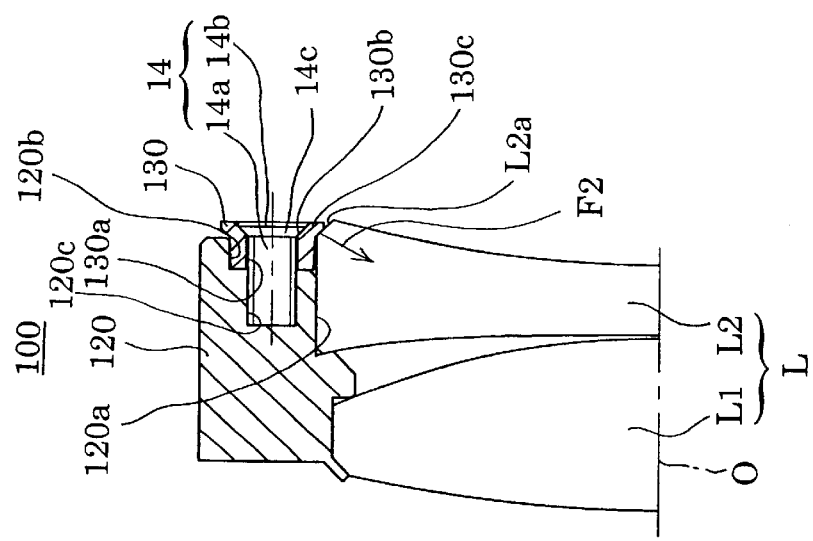
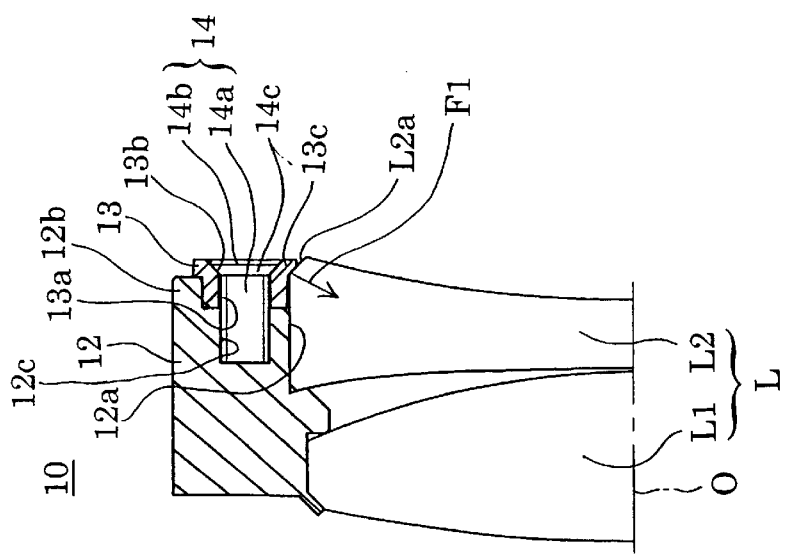

DEVICE FOR ADJUSTING THE ECCENTRICITY OF A LENS IN A FRAME

BACKGROUND OF THE INVENTION

1. Field of the Invention

The present invention relates to a device for adjusting the eccentricity of a lens in a frame (holder).

2. Description of the Related Art

Various devices for adjusting the eccentricity of a lens that is held by a lens frame are known in the art. For instance, in one known device, the eccentricity is adjusted by directly pressing the rim of the lens in a radial direction by an adjustment screw. In another known device, the eccentricity is adjusted by providing an adjustment frame between the lens and the lens frame. In another known device, the eccentricity is adjusted by injecting an adhesive between the rim of the lens and the lens frame. However, these known devices have the following problems. In the above-mentioned first device, pressure on the rim of the lens by the adjustment screw may cause the lens to be distorted. In the above-mentioned second device, the cost of production increases since it is necessary to provide an adjustment frame between the lens and the lens frame. In the above-mentioned third device, the cost of production increases since the lens frame needs to be provided with one or more injection groove or hole through which an adhesive is injected; and it is extremely difficult or almost impossible to remove the lens from the lens frame once lens is cemented to the lens frame.

SUMMARY OF THE INVENTION

The primary object of the present invention is to provide a device for adjusting the eccentricity of a lens, wherein the eccentricity can be adjusted using the adjusting device with a high degree of precision even though the structure of the device is simple.

To achieve the object mentioned above, according to an aspect of the present invention, a lens eccentricity adjusting device is provided for adjusting an eccentricity of a lens having a circular rim which is held by a lens frame, the adjusting device including a circular opening formed on the lens frame, the lens being fitted into the circular opening; at least three flat countersunk head screws, each being screwed into the lens frame, the flat countersunk head screws being positioned at substantially regular intervals along a circumference of the lens, each of the flat countersunk head screws including a male thread portion that is screwed into the lens frame and a head portion having a tapered surface which tapers down to the male thread portion; and at least one elastic member positioned between each of the flat countersunk head screws and the rim of the lens. The eccentricity is adjusted by deforming the at least one elastic member so as to apply pressure on the rim of the lens via the tapered surface of a corresponding flat countersunk head screw, in accordance with the amount of which the corresponding flat countersunk head screw is screwed into the lens frame, so that the lens is moved in the circular opening in a radial direction.

In an embodiment, the at least one elastic member is a ring member which is fixed to the lens frame via the flat countersunk head screws to hold the lens between the lens frame and the ring member, so that an axial center of the ring member is substantially coincident with the center axis of the circular opening, wherein the ring member is fixed to the lens frame so that an inner peripheral surface of the ring member is in contact with the rim of the lens. Preferably, the lens frame is made of a macroscopically undeformable material.

Preferably, the ring member includes a tapered surface formed around one end of each of the at least three through holes, wherein each flat countersunk head screw is screwed into the lens frame with the tapered surface of each flat countersunk head screw being in intimate contact with a corresponding tapered surface of each through hole therefor.

Preferably, the ring member includes at least three through holes into which the at least three flat countersunk head screws are respectively inserted to be screwed into the lens frame.

In another embodiment, the at least one elastic member includes at least three ring members into which the at least three flat countersunk head screws are respectively inserted to be screwed into the lens frame, so as to hold the lens between the lens frame and the at least three ring members, wherein each of the at least three ring members is fixed to the lens frame so that an outer peripheral surface of the each ring member is in contact with the rim of the lens. Preferably, the lens frame is made of a macroscopically undeformable material.

Preferably, each of the at least three ring members includes a tapered surface formed around one end of a through hole of each of the at least three ring members. Each of the at least three flat countersunk head screws is screwed into the lens frame with the tapered surface of each of the at least three flat countersunk head screws being in intimate contact with corresponding the tapered surface of each of the at least three ring members.

In another embodiment, the at least one elastic member includes at least three deformable portions formed integrally with the lens frame to correspond to the at least three flat countersunk head screws, each of the at least three deformable portions being in contact with the rim of the lens. Preferably, the lens frame is made of an elastic material.

Preferably, the lens frame includes at least three threaded holes into which the at least three flat countersunk head screws are respectively screwed; and a tapered surface formed around an outer end of each of the at least three threaded holes. Each of the at least three flat countersunk head screws is screwed into corresponding one of the three threaded holes with the tapered surface of each flat countersunk head screw being in intimate contact with a corresponding tapered surface of each threaded hole therefor.

Preferably, the at least one elastic member is formed from a type of engineering plastics.

Preferably, an amount of the eccentricity, that is adjusted according to a variation of the amount of which each of the at least one flat countersunk head screw is screwed into the lens frame, is of the order of several micrometers.

The lens frame can hold another lens, the lens eccentricity adjusting device being operated to adjust the eccentricity of the lens with respect to the another lens.

In an embodiment, the three flat countersunk head screws are positioned at substantially 1200 intervals along the circumference of the lens. According to another aspect of the present invention, a method for adjusting an eccentricity of a lens having a circular rim which is held by a lens frame is provided, including fitting the lens into a circular opening formed on the lens frame; screw-engaging at least three flat countersunk head screws into the lens frame at an equi-angular distance outside and around the circular opening; positioning at least one elastic member between each of the at least three flat countersunk head screws and the rim of the lens; and adjusting the position of the lens in the circular opening by adjusting the screwing position of at least one of the at least three flat countersunk head screws which is screwed into the lens frame so that the lens is moved in the circular opening in a radial direction, wherein the at least one elastic member is depressed by the pressure of the three flat countersunk head screws on the rim of the lens.

The present disclosure relates to subject matter contained in Japanese Patent Application No.2000-016787 (filed on Jan. 26, 2000) which is expressly incorporated herein by reference in its entirety.

BRIEF DESCRIPTION OF THE DRAWINGS

The present invention will be described below in detail with reference to the accompanying drawings in which:

FIG. 1 is a cross sectional view of the first embodiment of a lens barrel having a lens eccentricity adjusting device according to the present invention, taken along I—I line in FIG. 2, looking in the direction of the appended arrows;

FIG. 3 is a view similar to that of FIG. 1 and illustrates the second embodiment of the lens barrel having a lens eccentricity adjusting device according to the present invention;

FIG. 5 is a view similar to that of FIG. 1 and illustrates the third embodiment of the lens barrel having a lens eccentricity adjusting device according to the present invention.

DESCRIPTION OF THE PREFERRED EMBODIMENTS

Figure 2:
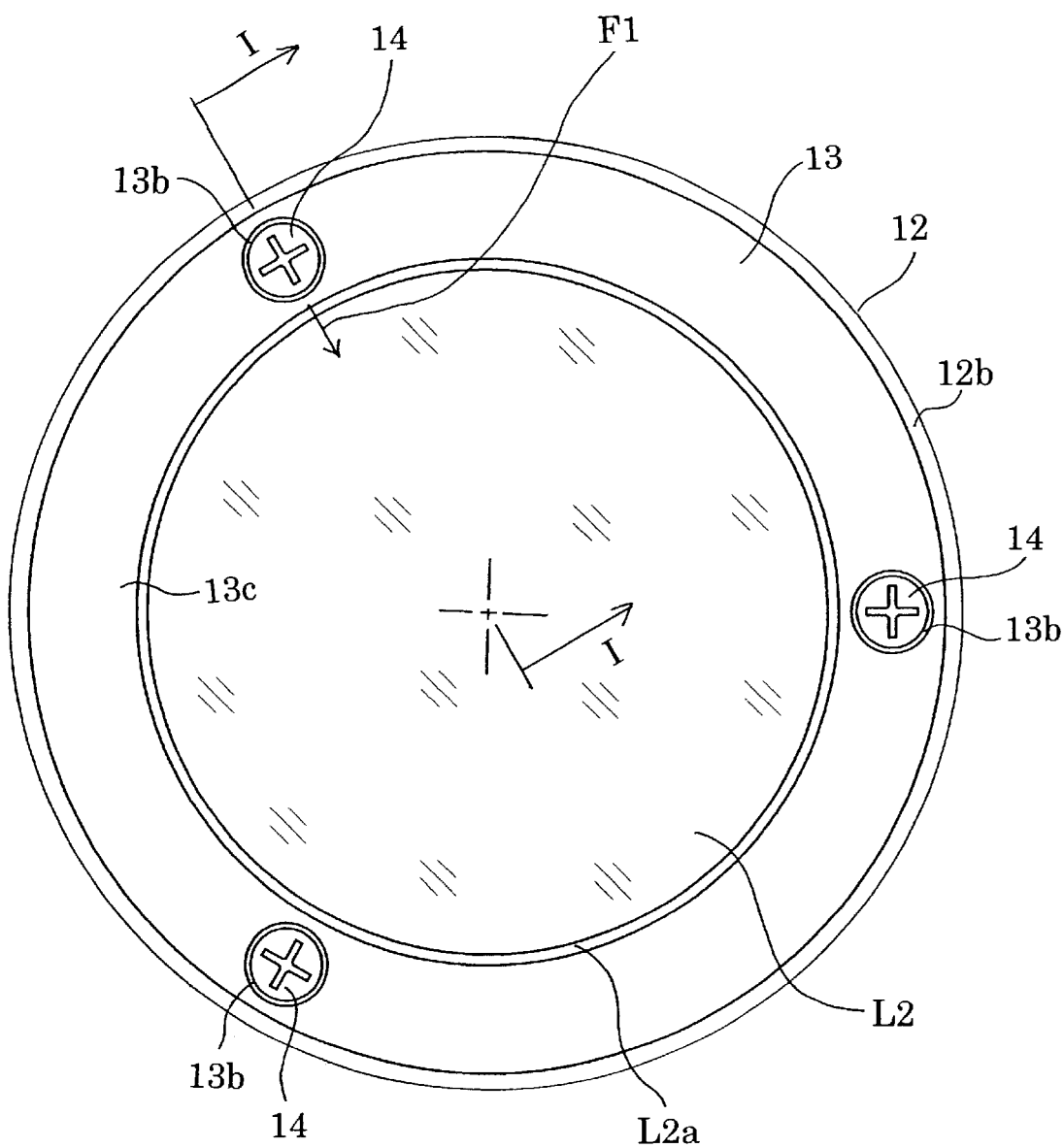
FIG. 2 is a front view of the first embodiment of the lens barrel shown in FIG. 1.

FIGS. 1 and 2 show the first embodiment of a lens barrel having a lens eccentricity adjusting device according to the present invention. The lens barrel 10 is provided with a lens group L including a front lens element L1 and a rear lens element L2, and a cylindrical lens frame 12 which encloses the lens group L1 to hold the same. The lens frame 12 is made of an undeformable material in a macroscopic view (e.g., a hard engineering plastic). The front lens element L1 is fixed to the lens frame 12 with a known device (e.g., the inner edge of the front end of the lens frame 12 is deformed inwardly by heat) after having been fitted in the lens frame 12 from the front side thereof (the left side as viewed in FIG. 1). The fixing structure of the front lens element L1 to the lens frame 12 does not relate to the present invention, therefore, details on the fixing structure of the front lens element L1 are not herein described. The lens frame 12 is provided at the rear end thereof with a circular opening 12a in which the circular rear lens element L2 is fitted. The lens frame 12 is provided on the rear face thereof (the right face as viewed in FIG. 1) with three threaded holes 12c at substantially 120° intervals along the circumference of the rear lens element L2. The lens barrel 10 is further provided with a holding ring (annular member) 13 that is fixed to the rear face of the lens frame 12 via three flat countersunk head screws 14 which are respectively screwed into the three threaded holes 12c, so that the axial center of the holding ring 13 is coincident with the axis of the circular opening 12a of the lens frame 12. The rear lens element L2 is held between the lens frame 12 and the holding ring 13. The holding ring 13 is made of an elastic material; specifically, in the illustrated embodiment, a polycarbonate resin which is a type of engineering plastics is used. The lens frame 12 is provided, at the outer edge of the rear end of the lens frame 12, with an annular projection 12b which extends rearward (toward the right as viewed in FIG. 1). The holding ring 13 is fixed to the lens frame 12 with an outer peripheral surface of the holding ring 13 being in contact with the inner peripheral surface of the annular projection 12b. As shown in FIG. 2, the three flat countersunk head screws 14, by which the holding ring 13 is fixed to the lens frame 12, are positioned at substantially regular intervals around the circumference of the rear lens element L2. Each of the three flat countersunk head screws 14 is provided with a male thread portion 14a that is screwed into one of the threaded holes 12c of the lens frame 12, and a head portion 14b from which the males thread portion 14a extends. The head portion 14b is provided with a tapered surface 14c which tapers down to the male thread portion 14a (toward the left as viewed in FIG. 1). The holding ring 13 is provided with three through holes 13a into which the three flat countersunk head screws 14 are inserted to be screwed into the three threaded holes 12c of the lens frame 12, respectively. The holding ring 13 is provided, around the rear end of each of the three through holes 13a, with a tapered surface 13b which tapers toward the front end (the left end as viewed in FIG. 1) of the corresponding through hole 13a. As can be seen in FIG. 1, each flat countersunk head screw 14 is fixed to the lens frame 12 with the tapered surface 14c of the flat countersunk head screw 14 being in intimate contact with the corresponding tapered surface 13b. The holding ring 13 is provided, at the inner edge of the rear end of the holding ring 13, with an annular tapered portion 13c which tapers rearward in the direction of the optical axis O of the lens group L1 (i.e., toward the right side as viewed in FIG. 1). The annular tapered portion 13c extends along and contacts with an annular beveled surface L2a formed at the rear end of the rim of the rear lens element L2. The rear lens element L2 is fixed to the lens frame 12 in the circular opening 12a via the holding ring 13 and the flat countersunk head screws 14 with the annular tapered portion 13c being in pressing contact with the annular beveled surface L2a of the rear lens element L2.

In the lens barrel 10 having the structure described above, if one of the three flat countersunk head screws 14 is further screwed into the corresponding threaded hole 12c in a state shown in FIG. 1, the tapered surface 14c of the flat countersunk head screw 14 digs into the through hole 13a along the tapered surface 13b. This causes part of the holding ring 13 around the flat countersunk head screw 14 to deform to expand in a radial direction of the holding ring 13, so that the corresponding part of the annular tapered portion 13c presses the annular beveled surface L2a of the rear lens element L2 inwardly. By utilizing this pressing force, the eccentricity of the rear lens element L2 with respect to the front lens element L1 in the lens frame 12 can be adjusted. Namely, the amount of eccentricity of the rear lens element L2 with respect to the front lens element L1 varies by a variation of the amount of screwing of each flat countersunk head screw 14 into the corresponding threaded hole 12c. In the illustrated embodiment, the eccentricity of the rear lens element L2 with respect to the front lens element L1 can be adjusted by moving the rear lens element L2 in a direction perpendicular to the optical axis O within a tolerance of the inner diameter of the lens frame 12 (for example, approximately 10 micrometers). The holding ring 13 and the three flat countersunk head screws 14 are fundamental elements of the lens eccentricity adjusting device that is incorporated in the first embodiment of the lens barrel 10.

In the first embodiment of the lens barrel 10, since the rear lens element L2 is pressed indirectly by the flat countersunk head screws 14 via the holding ring 13, which is made of an elastic material, the amount of deformation of the rear lens element L2 is minimal as compared with a case where the rear lens element L2 is pressed directly by screws. Moreover, deformation of the holding ring 13 due to a tightening operation of any one of the flat countersunk head screws 14 reliably presses the corresponding part of the annular beveled surface L2a of the rear lens element L2 inwardly, since the outer peripheral surface of the holding ring 13 is in contact with the inner peripheral surface of the annular projection 12b, which is made of a macroscopically undeformable material. An arrow F1 shown in FIG. 1 indicates the direction in which the annular tapered portion 13c of the holding ring 13 presses the annular beveled surface L2a of the rear lens element L2 by the deformation of the holding ring 13.

Figure 4:
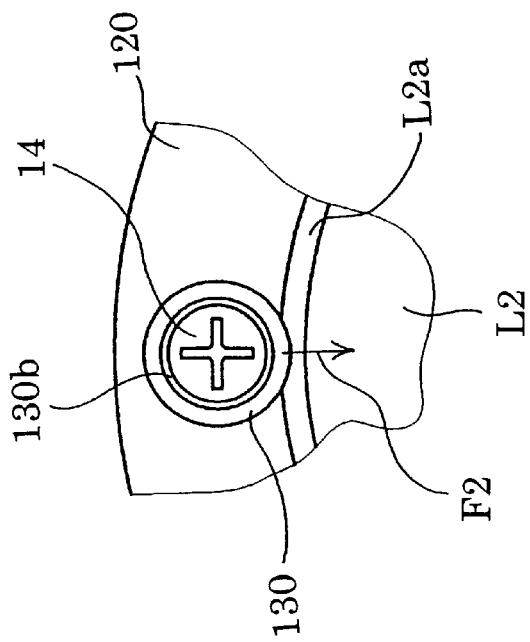
FIG. 4 is a fragmentary front view of the second embodiment of the lens barrel shown in FIG. 3, showing a fundamental portion thereof.

FIGS. 3 and 4 show the second embodiment of the lens barrel having a lens eccentricity adjusting device according to the present invention. In a lens barrel 100 of the second embodiment, a lens frame 120, which corresponds to the lens frame 12 of the first embodiment, is provided with a circular opening 120a, which corresponds to the circular opening 12a of the first embodiment, so that the rear lens element L2 is fixed into the circular opening 120a. The lens frame 120 is provided on the rear end face thereof with three circular recesses 120b positioned at substantially regular intervals along a circumference of the rear lens element L2. The lens barrel 100 is provided with three elastic rings 130 which are made of an elastic material that is similar to the material of the holding ring 13 of the first embodiment. The three elastic rings 130 are respectively fitted in the three circular recesses 120b. Three flat countersunk head screws 14 are inserted into the three elastic rings 130 to be screwed into three threaded holes 120c of the lens frame 120 which correspond to the three threaded holes 12c of the first embodiment, respectively. Each elastic ring 130 is provided with a through hole 130a into which one of the three flat countersunk head screws 14 is inserted. Each elastic ring 130 is further provided, around the rear end of the through hole 130a, with a tapered surface 130b which tapers toward the front end (the left end as viewed in FIG. 3) of the through hole 130a. As can be seen in FIG. 3, each flat countersunk head screw 14 is fixed to the lens frame 120 with the tapered surface 14c of the flat countersunk head screw 14 being in intimate contact with the tapered surface 130b of the corresponding elastic ring 130.

Each elastic ring 130 is provided at the rear end thereof with a large diameter portion 130c which contacts the annular beveled surface L2a of the rear lens element L2. The rear lens element L2 is fixed to the lens frame 120 in the circular opening 120a via the elastic rings 130 and the flat countersunk head screws 14 with the large diameter portion 130c of each elastic ring 130 being in pressing contact with the annular beveled surface L2a of the rear lens element L2. In the lens barrel 100 having the structure described above, if one of the three flat countersunk head screws 14 is further screwed into the corresponding threaded hole 120c from the position shown in FIG. 3, the tapered surface 14c of the flat countersunk head screw 14 digs into the through hole 130a of the corresponding elastic ring 130 around the tapered surface 130b thereof. This causes the elastic ring 130 to deform and expand radially, so that the large diameter portion 130c of the elastic ring 130 presses the annular beveled surface L2a of the rear lens element L2 inwardly. By utilizing this pressing force, the eccentricity of the rear lens element L2 can be adjusted with respect to the front lens element L1. An arrow F2 shown in FIG. 3 indicates the direction in which the large diameter portion 130c of the elastic ring 130 shown in FIG. 3 presses the annular beveled surface L2a of the rear lens element L2 by deformation of the elastic ring 130. In the second embodiment, similar to the first embodiment, the eccentricity of the rear lens element L2 with respect to the front lens element L1 can be adjusted by moving the rear lens element L2 in a direction perpendicular to the optical axis O within a tolerance of the inner diameter of the lens frame 120 (approximately 10 micrometers). The three elastic rings 130 and the three flat countersunk head screws 14 are fundamental elements of the lens eccentricity adjusting device that is incorporated in the second embodiment of the lens barrel 100.

Figure 6:
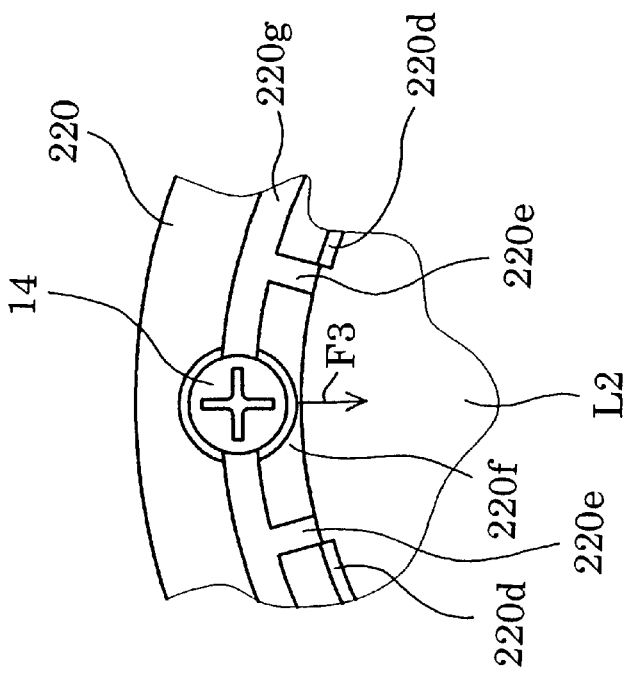
FIG. 6 is a fragmentary front view of the third embodiment of the lens barrel shown in FIG. 5, showing a fundamental portion thereof.

FIGS. 5 and 6 show the third embodiment of the lens barrel having a lens eccentricity adjusting device according to the present invention. In a lens barrel 200 of the second embodiment, a lens frame 220, which corresponds to the lens frame 12 of the first embodiment, is provided with a circular opening 220a, which corresponds to the circular opening 12a of the first embodiment, so that the rear lens element L2 is fixed into the circular opening 220a. In the third embodiment, intermediate members which correspond to the holding ring 13 of the first embodiment or the elastic rings 130 of the second embodiment are not used, rather, the lens frame 220 itself is made of an elastic material such as a polycarbonate resin, so that a pressing force by each flat countersunk head screw 14 is transmitted to the rear lens element L2 via corresponding part of the elastic lens frame 220. This structure is peculiar to the third embodiment of the lens barrel having a lens eccentricity adjusting device according to the present invention.

The lens frame 220 is provided on the rear end face thereof with a circumferential groove 220g which is a circular groove about the optical axis O. As shown by a two-dot chain line in FIG. 5, the depth of the circumferential groove 220g in the direction parallel to the optical axis O is smaller than the length of the male threaded portion 14a of each flat countersunk head screw 14, while the width of the circumferential groove 220g is smaller than the diameter of the male threaded portion 14a of each flat countersunk head screw 14. The lens frame 220 is provided on the rear end face thereof with three threaded holes 220b positioned at substantially regular intervals on and along the circumferential groove 220g. Three flat countersunk head screws 14 are respectively screwed into the three threaded holes 220b of the lens frame 120 directly. The lens frame 220 is provided, around the rear end of each of the three through holes 220b, with a tapered surface 220c which tapers toward the front end (the left end as viewed in FIG. 5) of the corresponding through holes 220b. As can be seen in FIG. 5, each flat countersunk head screw 14 is fixed to the lens frame 220 with the tapered surface 14c of the flat countersunk head screw 14 being in intimate contact with the corresponding tapered surface 220c.

The lens frame 220 is provided, at the inner edge of the rear end of the lens frame 220, with six inward protrusions 220d (only two are shown in FIG. 6) so that two of the inward protrusions 220d are positioned on the opposite sides of each flat countersunk head screw 14 along a circumference of the rear lens element L2. Each of the six inward protrusions 220d extends along and contacts the annular beveled surface L2a of the rear lens element L2. The rear lens element L2 is fixed to the lens frame 220 in the circular opening 220a via the flat countersunk head screws 14 with the six inward protrusions 220d being in press-contact with the annular beveled surface L2a of the rear lens element L2. In a state shown in FIG. 5 where the rear lens element L2 is properly fixed to the lens frame 220, each inward protrusion 220d is elastically deformed slightly outward in a radial direction of the lens frame 220. Each inward protrusion 220d, which is connected to the circumferential groove 220g, can be easily deformed outward in a radial direction of the lens frame 220.

The lens frame 220 is further provided on the rear end face thereof with six radial grooves 220e (two of them are shown in FIG. 6) so that two radial grooves 220e are positioned on the opposite sides of each flat countersunk head screw 14 along a circumference of the rear lens element L2. Each radial groove 220e extends from the circumferential groove 220g to the circular opening 220a inwardly in a radial direction of the lens frame 220. The depth of each radial groove 220e is identical to that of the circumferential groove 220g. By providing the lens frame 220 with not only the circumferential groove 220g but also two radial grooves 220e on the opposite sides of each flat countersunk head screw 14 along a circumference of the rear lens element L2, the inner portion (deformable portion) 220f of the lens frame 220 which is positioned between each flat countersunk head screw 14 and the rear lens element L2 can be easily deformed toward the rim of the rear lens element L2.

In the lens barrel 200 having the structure described above, if one of the three flat countersunk head screws 14 is further screwed into the corresponding threaded hole 220b in a state shown in FIG. 5, the tapered surface 14c of the flat countersunk head screw 14 digs into the through hole 220b along the tapered surface 220c. This causes the corresponding inner portion 220f of the lens frame 220 to deform toward the rim of the rear lens element L2 to thereby press the inner portion 220f inwardly. By utilizing this pressing force, the eccentricity of the rear lens element L2 can be adjusted with respect to the front lens element L1. An arrow F3 shown in FIG. 5 indicates the direction in which the inner portion 220f shown in FIG. 5 presses the rear lens element L2. Although the lens frame 220 is made of an elastic material, portions of the lens frame 220 other than the inner portions 220f and the inward protrusions 220d possess high stiffness, and hence, are not substantially deformed by a tightening operation of any flat countersunk head screw 14. In the third embodiment, similar to the first embodiment, the eccentricity of the rear lens element L2 with respect to the front lens element L1 can be adjusted by moving the rear lens element L2 in a direction perpendicular to the optical axis O within a tolerance of the inner diameter of the lens frame 220 (approximately 10 micrometers). The inner portions 220f of the lens frame 220 and the three flat countersunk head screws 14 are fundamental elements of the lens eccentricity adjusting device that is incorporated in the third embodiment of the lens barrel 200.

In each of the above illustrated embodiments, although the three flat countersunk head screws 14 are positioned at substantially regular intervals along a circumference of the rear lens element L2, the present invention is not limited solely to this particular structure. Namely, more than three flat countersunk head screws 14 can be positioned at substantially regular intervals along a circumference of the rear lens element L2.

Although the holding ring 13, each of the three elastic rings 130 and the lens frame 220 are made of an elastic material in the first, second and third embodiments respectively, the elastic material is not limited solely to polycarbonate resin, but can be any other elastic material. The configuration of the lens group fixed to the lens frame and the shape of each lens fixed to the lens frame are not limited solely to each of the above illustrated particular embodiments.

As can be understood from the foregoing, according to a lens eccentricity adjusting device to which the present invention is applied, since at least one elastic member, which is deformed by pressure of the tapered surface of a corresponding flat countersunk head screw to press the rim of the lens in accordance with the amount the corresponding flat countersunk head screw is screwed into the lens frame, is disposed between each of the flat countersunk head screws and the rim of said lens, the eccentricity of the lens can be adjusted using the adjusting device with a high degree of precision though the structure of the device is simple.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A lens eccentricity adjusting device for adjusting an eccentricity of a lens having a circular rim which is held by a lens frame, said adjusting device comprising:

a circular opening formed on said lens frame, said lens being fitted into said circular opening;

at least three flat countersunk head screws, each being screwed into said lens frame, said at least three flat countersunk head screws being positioned at substantially regular intervals along a circumference of said lens, each of said at least three flat countersunk head screws comprising a male thread portion that is screwed into said lens frame and a head portion having a tapered surface which tapers down to said male thread portion; and at least one elastic member positioned between each of said at least three flat countersunk head screws and said rim of said lens;

wherein said eccentricity is adjusted by deforming said at least one elastic member so as to apply pressure on said rim of said lens via said tapered surface of corresponding one of said at least three flat countersunk head screws, in accordance with the amount of which said corresponding one of said at least three flat countersunk head screws is screwed into said lens frame, so that said lens is moved in said circular opening in a radial direction.

2. The lens eccentricity adjusting device according to claim 1, wherein said at least one elastic member comprises a ring member which is fixed to said lens frame via said at least three flat countersunk head screws to hold said lens between said lens frame and said ring member, so that an axial center of said ring member is substantially coincident with the center axis of said circular opening, wherein said ring member is fixed to said lens frame so that an inner peripheral surface of said ring member is in contact with said rim of said lens.

3. The lens eccentricity adjusting device according to claim 2, wherein said ring member comprises at least three through holes into which said at least three flat countersunk head screws are respectively inserted to be screwed into said lens frame.

4. The lens eccentricity adjusting device according to claim 1, wherein said at least one elastic member comprises at least three ring members into which said at least three flat countersunk head screws are respectively inserted to be screwed into said lens frame, so as to hold said lens between said lens frame and said at least three ring members, wherein each of said at least three ring members is fixed to said lens frame so that an outer peripheral surface of said each ring member is in contact with said rim of said lens.

5. The lens eccentricity adjusting device according to claim 1, wherein said at least one elastic member comprises at least three deformable portions formed integrally with said lens frame to correspond to said at least three flat countersunk head screws, each of said at least three deformable portions being in contact with said rim of said lens.

6. The lens eccentricity adjusting device according to claim 1, wherein said at least one elastic member is formed from a type of engineering plastics.

7. The lens eccentricity adjusting device according to claim 1, wherein an amount of said eccentricity, that is adjusted according to a variation of the amount of which each of said at least one flat countersunk head screw is screwed into said lens frame, is of the order of several micrometers.

8. The lens eccentricity adjusting device according to claim 1, wherein said lens frame holds another lens, said lens eccentricity adjusting device being operated to adjust said eccentricity of said lens with respect to said another lens.

9. The lens eccentricity adjusting device according to claim 1, wherein said at least three flat countersunk head screws comprise three flat countersunk head screws which are positioned at substantially 120° intervals along said circumference of said lens.

10. The lens eccentricity adjusting device according to claim 3, wherein said ring member comprises a tapered surface formed around one end of each of said at least three through holes, wherein each of said at least three flat countersunk head screws is screwed into said lens frame with said tapered surface of each of said at least three flat countersunk head screws being in intimate contact with corresponding said tapered surface of each of said at least three through holes.

11. The lens eccentricity adjusting device according to claim 4, wherein each of said at least three ring members comprises a tapered surface formed around one end of a through hole of each of said at least three ring members;

wherein each of said at least three flat countersunk head screws is screwed into said lens frame with said tapered surface of each of said at least three flat countersunk head screws being in intimate contact with corresponding said tapered surface of each of said at least three ring members.

12. The lens eccentricity adjusting device according to claim 5, wherein said lens frame comprises:

at least three threaded holes into which said at least three flat countersunk head screws are respectively screwed; and a tapered surface formed around an outer end of each of said at least three threaded holes;

wherein each of said at least three flat countersunk head screws is screwed into corresponding one of said three threaded holes with said tapered surface of each of said at least three flat countersunk head screws being in intimate contact with corresponding said tapered surface of said each of said at least three threaded holes.

13. The lens eccentricity adjusting device according to claim 2, wherein said lens frame is made of a macroscopically undeformable material.

14. The lens eccentricity adjusting device according to claim 4, wherein said lens frame is made of a macroscopically undeformable material.

15. The lens eccentricity adjusting device according to claim 5, wherein said lens frame is made of an elastic material.

16. A method for adjusting an eccentricity of a lens having a circular rim which is held by a lens frame, comprising:

fitting said lens into a circular opening formed on said lens frame;

screw-engaging at least three flat countersunk head screws into said lens frame at an equi-angular distance outside around said circular opening;

positioning at least one elastic member between each of said at least three flat countersunk head screws and said rim of said lens; and adjusting the position of the lens in the circular opening by adjusting screwing position of at least one of said at least three flat countersunk head screws which is screwed into said lens frame so that said lens is moved in said circular opening in a radial direction, wherein said at least one elastic member is depressed by the pressure of said three flat countersunk head screws on said rim of said lens.

* * * * *